United States Patent
Yuan et al.

(10) Patent No.: US 11,102,745 B2
(45) Date of Patent: Aug. 24, 2021

(54) METHOD AND APPARATUS FOR DOWNLINK SYNCHRONIZATION OF BROADCAST SIGNALS IN A WIRELESS COMMUNICATION SYSTEM

(71) Applicant: Huawei Technologies Co., Ltd., Shenzhen (CN)

(72) Inventors: Pu Yuan, Shanghai (CN); Jin Liu, Shenzhen (CN); Jun Luo, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 19 days.

(21) Appl. No.: 16/575,781

(22) Filed: Sep. 19, 2019

(65) Prior Publication Data
US 2020/0015182 A1 Jan. 9, 2020

Related U.S. Application Data

(63) Continuation of application No. PCT/CN2018/078333, filed on Mar. 7, 2018.

(30) Foreign Application Priority Data

Mar. 24, 2017 (CN) .......................... 201710184803.0

(51) Int. Cl.
*H04W 4/00* (2018.01)
*H04W 56/00* (2009.01)
(Continued)

(52) U.S. Cl.
CPC ....... *H04W 56/005* (2013.01); *H04W 56/001* (2013.01); *H04W 72/005* (2013.01); *H04W 76/27* (2018.02)

(58) Field of Classification Search
CPC . H04W 56/005; H04W 76/27; H04W 56/001; H04W 72/005
See application file for complete search history.

(56) References Cited

U.S. PATENT DOCUMENTS

2016/0013906 A1* 1/2016 Guo ..................... H04L 5/0073
370/329
2016/0262123 A1* 9/2016 Abedini ............ H04W 56/0015
(Continued)

FOREIGN PATENT DOCUMENTS

CN          101883412 A     11/2010
CN          103096329 A      5/2013
(Continued)

OTHER PUBLICATIONS

"SS Burst Composition and Time Index Indication Considerations," Agenda Item: 8.1.1.1.2, Source: Qualcomm Incoporated, Document for Discussion/Decision, 3GPP TSG-RAN WG1 NR #88, R1-1702585, Feb. 13-17, 2017, 6 pages.
(Continued)

*Primary Examiner* — Abdelnabi O Musa
(74) *Attorney, Agent, or Firm* — Slater Matsil, LLP

(57) ABSTRACT

A downlink synchronization method and apparatus, the method including receiving configuration information of a synchronization signal and physical broadcast channel (PBCH) block and that is sent by a transmission reception point (TRP), where the configuration information of the synchronization signal and PBCH block includes at least one of location indication information or time cycle indication information, determining at least one of a location of the synchronization signal and PBCH block in a synchronization signal burst set according to the location indication information or a time cycle of a synchronization signal burst set according to the time cycle indication information, receiving the synchronization signal and PBCH block according to at least one of the location or the time cycle, and performing downlink synchronization according to the synchronization signal and PBCH block.

20 Claims, 6 Drawing Sheets

(51) Int. Cl.
H04W 76/27 (2018.01)
H04W 72/00 (2009.01)

(56) References Cited

U.S. PATENT DOCUMENTS

| | | | |
|---|---|---|---|
| 2017/0094621 A1* | 3/2017 | Xu | H04L 47/125 |
| 2018/0167946 A1* | 6/2018 | Si | H04L 5/0048 |
| 2018/0309612 A1* | 10/2018 | Kim | H04W 56/002 |

FOREIGN PATENT DOCUMENTS

| | | |
|---|---|---|
| CN | 103402251 A | 11/2013 |
| CN | 106102136 A | 11/2016 |
| WO | 2016203290 A1 | 12/2016 |

OTHER PUBLICATIONS

"3rd Generation Partnership Project; Technical Specification Group Radio Access Network; Study on New Radio (NR) Access Technology; Physical Layer Aspects (Release 14)," 3GPP TR 38.802 V2.0.0, Mar. 2017, 134 pages.

"NR Primary and Secondary Synchronization Signals Design," Agenda Item: 7.1.2.1, Source: Huawei, HiSilicon, Document for: Discussion and Decision, 3GPP TSG RAN WG1 Meeting #87, R1-1611261, Nov. 14-18, 2016, 10 pages.

"Considerations on SS Burst Design and Indication," Agenda Item: 8.1.1.1.2, Source: InterDigital Communications, Document for: Discussion and Decision, 3GPP TSG RAN WG1 Meeting #88, R1-1702315, Feb. 13-17, 2017, 6 pages.

"On Requirements and Design of SS Burst Set and SS Block Index Indication," Agenda Item: 8.1.1.1.2, Source: Nokia, Alcatel-Lucent Shanghai Bell, Document for: Discussion and Decision, 3GPP TSG-RAN WG1 Meeting #88, R1-1703092, Feb. 13-17, 2017, 16 pages.

"Draft Report of 3GPP TSG RAN WG1 #88bis v0.1.0 (Spokane, USA, Apr. 3-7, 2017)," Source: MCC Support, Document for: Comments, 3GPP TSG RAN WG1 Meeting #89, R1-17xxxxx, Hangzhou, China, May 15-19, 2017, 148 pages.

* cited by examiner

METHOD AND APPARATUS FOR DOWNLINK SYNCHRONIZATION OF BROADCAST SIGNALS IN A WIRELESS COMMUNICATION SYSTEM

CROSS-REFERENCE TO RELATED APPLICATIONS

This application is a continuation of International Application No. PCT/CN2018/078333, filed on Mar. 7, 2018, which claims priority to Chinese Patent Application No. 201710184803.0, filed on Mar. 24, 2017. The disclosures of the aforementioned applications are hereby incorporated by reference in their entireties.

TECHNICAL FIELD

This application relates to the field of communications technologies, and in particular, to a downlink synchronization method and apparatus.

BACKGROUND

When accessing a mobile communications cell, user equipment (UE) first performs cell search, and then performs downlink synchronization. In a downlink synchronization process, the UE detects a synchronization signal (SS), and decodes a physical broadcast channel (PBCH), to obtain key system parameter information. Synchronization signals are classified into a primary synchronization signal (PSS) and a secondary synchronization signal (SSS).

In a long term evolution (LTE) communications system, each of the PSS and the SSS occupies six contiguous resource blocks (RB), and is configured at a fixed time-frequency resource location in a radio frame. In a next-generation communications system of the LTE communications system, a different structure is used in a synchronization signal design. Because of implementation of a beam sweeping technology, synchronization signals are sent by using a plurality of beams to improve a success rate of synchronization access. The PSS and the SSS form a synchronization signal and PBCH block (SS block) in a frequency division manner. Each synchronization signal and PBCH block is sent by using one analog beam. A plurality of SS blocks form a synchronization signal burst (SS burst), and a plurality of SS bursts form a synchronization signal burst set (SS burst set). One SS burst set is corresponding to a complete beam sweeping process. In the synchronization signal design, it is further specified that the SS burst set has at least one default cycle, and may have a plurality of optional cycles. In addition, a time location of the SS block in the radio frame is further specified in the synchronization signal design, but a transmission reception point (TRP) may send the SS block at a particular time location as required, and some vacant location may be used for another purpose.

The SS burst set may have a plurality of optional cycles, and the SS block may be also at a plurality of time locations in the radio frame. Therefore, the UE needs to perform related detection a plurality of times by using the SS, to determine a cycle of the SS burst set and a time location of the SS block in the radio frame. Consequently, downlink measurement efficiency is low.

SUMMARY

Embodiments of the present invention provide a downlink synchronization method and apparatus, so that UE can more accurately perform downlink synchronization by using a synchronization signal, thereby effectively improving utilization of spectrum resources.

According to a first aspect, an embodiment of the present invention provides a downlink synchronization method, including generating configuration information of a synchronization signal and PBCH block, where the configuration information of the synchronization signal and PBCH block includes location indication information, and sending the configuration information of the synchronization signal and PBCH block to user equipment, where the location indication information is used to indicate a location of the synchronization signal and PBCH block in a synchronization signal burst set.

With reference to the first aspect, in a possible implementation of the first aspect, the sending the configuration information of the synchronization signal and PBCH block to user equipment includes sending the configuration information of the synchronization signal and PBCH block to the user equipment by using a radio resource control RRC message, sending the configuration information of the synchronization signal and PBCH block to the user equipment by using a physical broadcast channel, or sending the configuration information of the synchronization signal and PBCH block to the user equipment by using a system information block.

With reference to the first aspect, in a possible implementation of the first aspect, the location indication information includes a location indication value, and the location indication value is used by the user equipment to determine the location of the synchronization signal and PBCH block in the synchronization signal burst set based on the location indication value and a first preset mapping relationship.

With reference to the first aspect or the possible implementation of the first aspect, in another possible implementation of the first aspect, the location indication information includes an N-bit binary number, N is a quantity of synchronization signal and PBCH blocks in the synchronization signal burst set, each bit in the N-bit binary number is corresponding to one synchronization signal and PBCH block, and the N-bit binary number is used by the user equipment to determine a location of the synchronization signal and PBCH block in the synchronization signal burst set based on a binary value of each bit.

With reference to any one of the first aspect or the possible implementations of the first aspect, in another possible implementation of the first aspect, a binary value 1 is used to indicate that a synchronization signal and PBCH block is sent at a corresponding location in the synchronization signal burst set, and a binary value 0 is used to indicate that no synchronization signal and PBCH block is sent at a corresponding location in the synchronization signal burst set, or a binary value 1 is used to indicate that no synchronization signal and PBCH block is sent at a corresponding location in the synchronization signal burst set, and a binary value 0 is used to indicate that a synchronization signal and PBCH block is sent at a corresponding location in the synchronization signal burst set.

With reference to any one of the first aspect or the possible implementations of the first aspect, in another possible implementation of the first aspect, the configuration information of the synchronization signal and PBCH block further includes time cycle indication information, and the time cycle indication information is used to indicate a time cycle of the synchronization signal burst set.

According to a second aspect, an embodiment of the present invention provides a downlink synchronization method, including receiving configuration information, of a synchronization signal and PBCH block, that is sent by a transmission reception point TRP, where the configuration information of the synchronization signal and PBCH block includes location indication information, and determining a location of the synchronization signal and PBCH block in a synchronization signal burst set based on the location indication information, receiving the synchronization signal and PBCH block at the location, and performing downlink synchronization based on the synchronization signal and PBCH block.

With reference to the second aspect, in a possible implementation of the second aspect, the receiving configuration information, of a synchronization signal and PBCH block, that is sent by a transmission reception point TRP includes receiving a radio resource control RRC message sent by the TRP, where the radio resource control RRC message includes the configuration information of the synchronization signal and PBCH block, receiving the synchronization signal and PBCH block sent by the TRP, where the synchronization signal and PBCH block includes a synchronization signal and a physical broadcast channel PBCH, and the PBCH includes the configuration information of the synchronization signal and PBCH block, or receiving a system information block sent by the TRP, where the system information block includes the configuration information of the synchronization signal and PBCH block.

With reference to the second aspect or the possible implementation of the second aspect, in another possible implementation of the second aspect, the location indication information includes a location indication value, and the determining a location of the synchronization signal and PBCH block in a synchronization signal burst set based on the location indication information, receiving the synchronization signal and PBCH block at the location, and performing downlink synchronization based on the synchronization signal and PBCH block includes determining the location of the synchronization signal and PBCH block in the synchronization signal burst set based on the location indication value and a first preset mapping relationship, receiving the synchronization signal and PBCH block at the location, and performing downlink synchronization based on the synchronization signal and PBCH block.

With reference to any one of the second aspect or the possible implementations of the second aspect, in another possible implementation of the second aspect, the location indication information includes an N-bit binary number, and N is a quantity of synchronization signal and PBCH blocks in the synchronization signal burst set, and the determining a location of the synchronization signal and PBCH block in a synchronization signal burst set based on the location indication information, receiving the synchronization signal and PBCH block at the location, and performing downlink synchronization based on the synchronization signal and PBCH block includes determining the location of the synchronization signal and PBCH block in the synchronization signal burst set based on the N-bit binary number, receiving the synchronization signal and PBCH block at the location, and performing downlink synchronization based on the synchronization signal and PBCH block.

With reference to any one of the second aspect or the possible implementations of the second aspect, in another possible implementation of the second aspect, the configuration information of the synchronization signal and PBCH block further includes time cycle indication information, and the method further includes determining a time cycle of the synchronization signal burst set based on the time cycle indication information and a second preset mapping relationship.

With reference to any one of the second aspect or the possible implementations of the second aspect, in another possible implementation of the second aspect, the method further includes receiving data or control signaling at a location that is in the synchronization signal burst set and at which no synchronization signal and PBCH block exists.

According to a third aspect, an embodiment of the present invention provides a downlink synchronization method, including generating configuration information of a synchronization signal and PBCH block, where the configuration information of the synchronization signal and PBCH block includes time cycle indication information, and sending the configuration information of the synchronization signal and PBCH block to user equipment, where the time cycle indication information is used to indicate a time cycle of a synchronization signal burst set.

With reference to the third aspect, in a possible implementation of the third aspect, the time cycle indication information includes a time cycle indication value, and the time cycle indication value is used by the user equipment to determine the time cycle of the synchronization signal burst set based on the time cycle indication value and a second preset mapping relationship.

According to a fourth aspect, an embodiment of the present invention provides a downlink synchronization method, including receiving configuration information, of a synchronization signal and PBCH block, that is sent by a transmission reception point TRP, where the configuration information of the synchronization signal and PBCH block includes time cycle indication information, and determining a time cycle of a synchronization signal burst set based on the time cycle indication information, receiving the synchronization signal and PBCH block based on the time cycle, and performing downlink synchronization based on the synchronization signal and PBCH block.

With reference to the fourth aspect, in a possible implementation of the fourth aspect, the time cycle indication information includes a time cycle indication value, and the determining a time cycle of a synchronization signal burst set based on the time cycle indication information includes determining the time cycle of the synchronization signal burst set based on the time cycle indication value and a second preset mapping relationship.

With reference to the fourth aspect or the possible implementation of the fourth aspect, in another possible implementation of the fourth aspect, the method further includes receiving data or control signaling at a location that is in a radio frame and at which no synchronization signal and PBCH block exists.

According to a fifth aspect, an embodiment of the present invention provides a transmission reception point, where the transmission reception point has a function of implementing behavior of the transmission reception point in the foregoing method embodiments. The function may be implemented by hardware, or may be implemented by hardware executing corresponding software. The hardware or software includes one or more modules corresponding to the foregoing functions.

According to a sixth aspect, an embodiment of the present invention provides a transmission reception point, including a processor, a memory, a bus, and a communications interface, where the memory is configured to store a computer execution instruction, the processor is connected to the memory by using the bus, and when the transmission reception point runs, the processor executes the computer execution instruction stored in the memory, so that the transmission reception point performs the downlink synchronization method according to any one of the first aspect or any one of the third aspect.

According to a seventh aspect, an embodiment of the present invention provides a computer-readable storage medium, where the computer-readable storage medium is configured to store a computer software instruction used by the foregoing transmission reception point, and when the computer software instruction runs on a computer, the computer may perform the downlink synchronization method according to any one of the first aspect or any one of the third aspect.

According to an eighth aspect, an embodiment of the present invention provides a computer program product including an instruction, and when the computer program product runs on a computer, the computer may perform a connection processing method in a multi-access scenario according to any one of the first aspect or any one of the third aspect.

In addition, for technical effects brought by any design manner of the fifth aspect to the eighth aspect, refer to technical effects brought by different design manners of the first aspect. Details are not described herein again.

According to a ninth aspect, an embodiment of the present invention provides user equipment, where the user equipment has a function of implementing behavior of the user equipment in the foregoing method embodiments. The function may be implemented by hardware, or may be implemented by hardware executing corresponding software. The hardware or software includes one or more modules corresponding to the foregoing functions.

According to a tenth aspect, an embodiment of the present invention provides user equipment, including a processor, a memory, a bus, and a communications interface, where the memory is configured to store a computer execution instruction, the processor is connected to the memory by using the bus, and when the user equipment runs, the processor executes the computer execution instruction stored in the memory, so that the user equipment performs the downlink synchronization method according to any one of the second aspect or any one of the fourth aspect.

In addition, for technical effects brought by any design manner of the ninth aspect and the tenth aspect, refer to technical effects brought by different design manners of the second aspect. Details are not described herein again.

According to the downlink synchronization method and apparatus in the embodiments of the present invention, the TRP sends the configuration information of the synchronization signal and PBCH block to the user equipment, where the configuration information of the synchronization signal and PBCH block includes the location indication information, and the user equipment determines the location of the synchronization signal and PBCH block in the synchronization signal burst set based on the location indication information, receives the synchronization signal and PBCH block at the location, and performs downlink synchronization based on the synchronization signal and PBCH block. In this way, the UE can more accurately perform downlink synchronization by using the synchronization signal, thereby effectively improving utilization of the spectrum resources.

BRIEF DESCRIPTION OF THE DRAWINGS

To describe the technical solutions in the embodiments of the present invention or in the prior art more clearly, the following briefly describes the accompanying drawings required for describing the embodiments or the prior art.

DETAILED DESCRIPTION OF ILLUSTRATIVE EMBODIMENTS

To make the objectives, technical solutions, and advantages of the embodiments of the present invention clearer, the following clearly and completely describes the technical solutions in the embodiments of the present invention with reference to accompanying drawings in the embodiments of the present invention.

User equipment (UE) in this specification may represent any applicable end-user equipment, and may include (or may represent) a device such as a wireless transmit/receive unit (WTRU), a mobile station, a mobile node, a mobile device, a fixed or mobile subscription unit, a pager, a mobile phone, a palmtop computer (PDA), a smartphone, a notebook computer, a computer, a touchscreen device, a wireless sensor, or a consumer digital device. The "mobile" station/node/device herein represents a station/node/device connected to a wireless (or mobile) network, but is not necessarily related to actual mobility of the station/node/device.

In this specification, "a plurality of" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
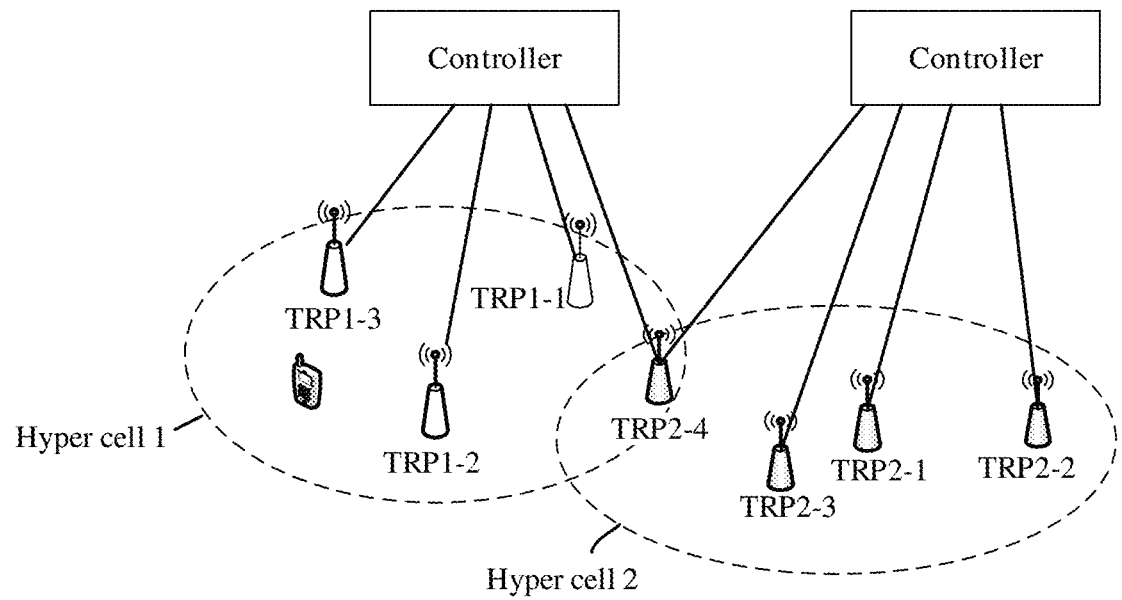
FIG. 1 is a schematic structural diagram of a system architecture according to an embodiment of the present invention.

FIG. 1 is a schematic structural diagram of a system architecture according to an embodiment of the present invention. As shown in FIG. 1, a communications network in this embodiment of the present invention may include a plurality of TRPs and controllers, and one or more TRPs may form a hyper cell to provide a service for UE. A boundary of the hyper cell may be flexibly configured as required. In FIG. 1, two hyper cells are used as an example for description. As shown in FIG. 1, a TRP1-1, a TRP1-2, and a TRP1-3 form a hyper cell 1, and a TRP2-1, a TRP2-2, a TRP2-3, and a TRP2-4 form a hyper cell 2. The UE may send uplink data by using a plurality of TRPs. A low frequency band or a high frequency band may be used for a TRP. When the TRP is deployed in a high-frequency manner, a beamforming technology may be used to resist vulnerability of a high-frequency link. An area of each TRP may be covered with a plurality of narrow high-gain beams, and each TRP may communicate with the UE by using a plurality of beams. Before communicating with the UE, the TRP needs to complete time synchronization. Specifically, the TRP sends synchronization signal and PBCH blocks (SS block) by using different beams, and the UE completes time synchronization based on a synchronization signal and PBCH block (SS block). In a downlink synchronization method in this embodiment of the present invention, a TRP indicates, to UE, a cycle of a synchronization signal burst set and/or a location of a synchronization signal and PBCH block (SS block), so that the UE can more accurately perform downlink synchronization by using a synchronization signal, thereby effectively improving utilization of spectrum resources.

The SS block is used for downlink synchronization, and the SS block may include a PSS, an SSS, and a PBCH. The UE may perform time synchronization by using the PSS and the SSS, and decode the PBCH to obtain system parameter information. A plurality of SS blocks distributed in a same slot are referred to as a synchronization signal burst, and a plurality of SS bursts form a synchronization signal burst set (SS burst set). One SS burst set is corresponding to a complete beam sweeping process.

Figure 2:
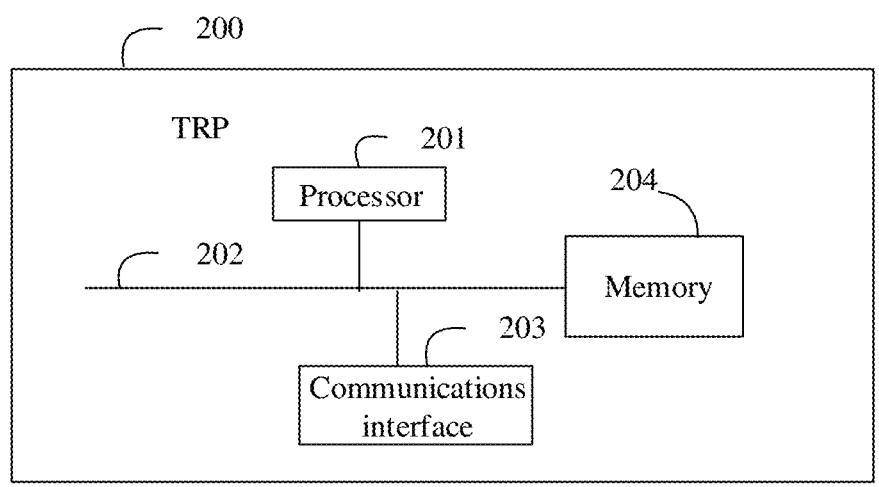
FIG. 2 is a schematic structural diagram of a TRP 200 according to an embodiment of the present invention.

FIG. 2 is a schematic structural diagram of a TRP 200 according to an embodiment of the present invention. The TRP 200 includes at least one processor 201, at least one communications interface 203, a memory 204, and at least one communications bus 202. The communications bus 202 is configured to implement a connection and communication between these components. The memory 204 may include a read-only memory and a random access memory, and provide an instruction and data for the processor 201. A part of the memory 204 may further include a nonvolatile random access memory (NVRAM).

In this embodiment of the present invention, the processor 201 is configured to perform steps in the following method embodiments by invoking a program or an instruction stored in the memory 204, so that UE can more accurately perform downlink synchronization by using a synchronization signal, thereby effectively improving utilization of spectrum resources. For a specific implementation process, refer to descriptions in the following method embodiments.

Figure 3:
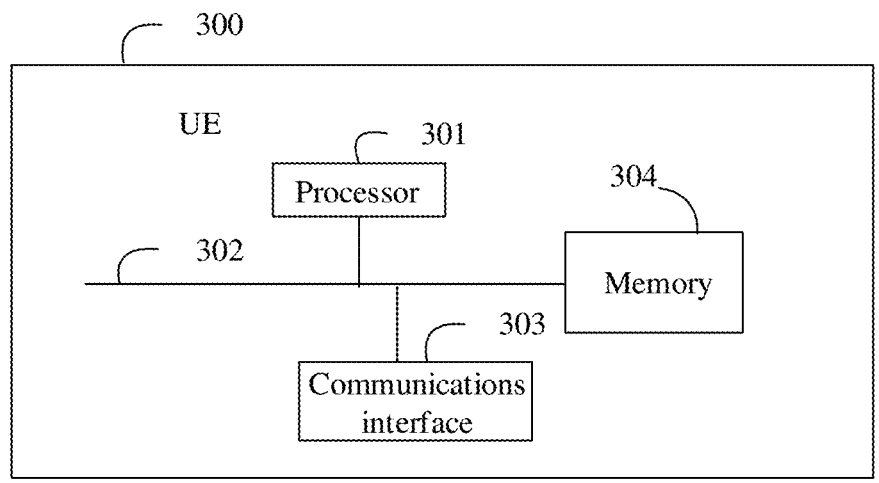
FIG. 3 is a schematic structural diagram of UE 300 according to an embodiment of the present invention.

FIG. 3 is a schematic structural diagram of UE 300 according to an embodiment of the present invention. The UE 300 includes at least one processor 301, at least one communications interface 303, a memory 304, and at least one communications bus 302. The communications bus 302 is configured to implement a connection and communication between these components. The memory 304 may include a read-only memory and a random access memory, and provide an instruction and data for the processor 301. A part of the memory 304 may further include a nonvolatile random access memory (NVRAM).

In this embodiment of the present invention, the processor 301 is configured to perform steps in the following method embodiments by invoking a program or an instruction stored in the memory 304, so that UE can more accurately perform downlink synchronization by using a synchronization signal, thereby effectively improving utilization of spectrum resources. For a specific implementation process, refer to descriptions in the following method embodiments.

Figure 4A:
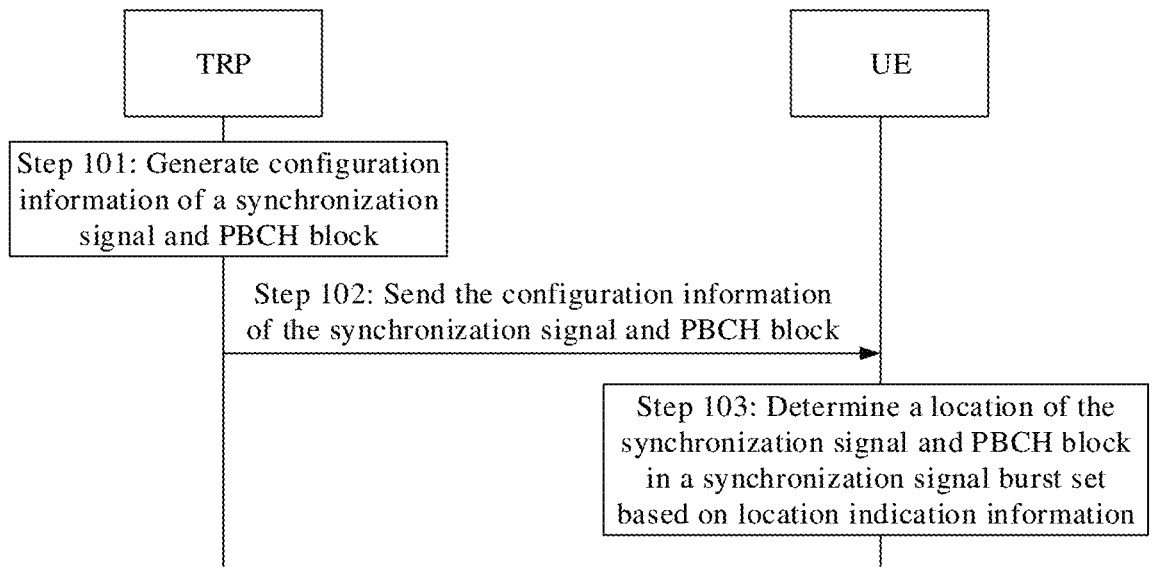
FIG. 4A is a flowchart of a downlink synchronization method according to an embodiment of the present invention.
Figure 4B:
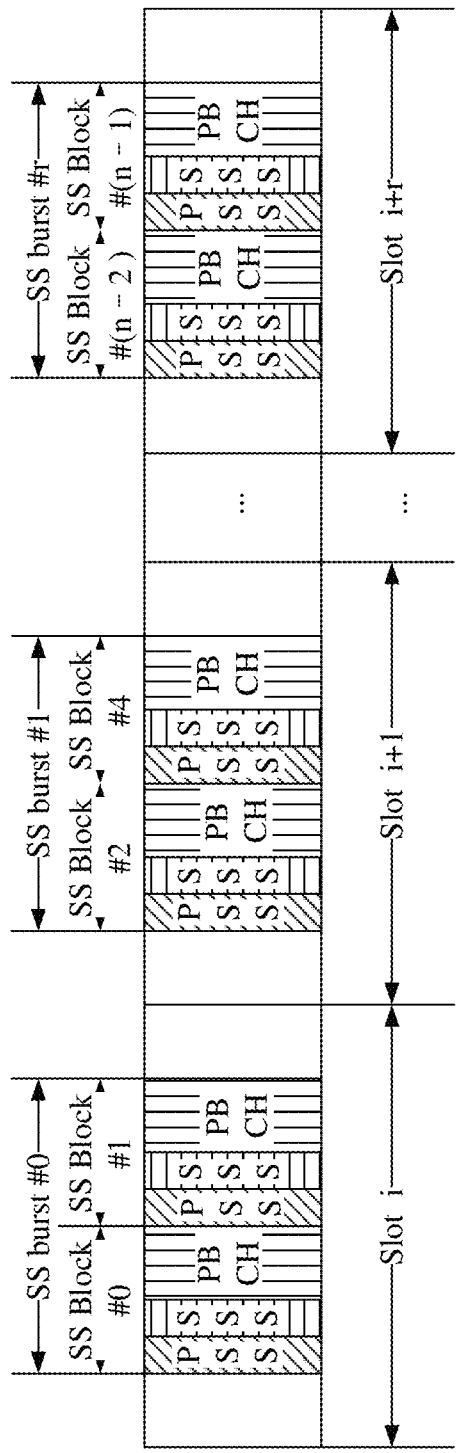
FIG. 4B is a schematic structural diagram of an SS burst set according to an embodiment of the present invention.

FIG. 4A is a flowchart of a downlink synchronization method according to an embodiment of the present invention. FIG. 4B is a schematic structural diagram of an SS burst set according to an embodiment of the present invention. As shown in FIG. 4A, the method in this embodiment may include the following steps.

Step 101: A TRP generates configuration information of a synchronization signal and PBCH block, where the configuration information of the synchronization signal and PBCH block includes location indication information.

Step 102: The TRP sends the configuration information of the synchronization signal and PBCH block to user equipment, where the location indication information is used to indicate a location of the synchronization signal and PBCH block in a synchronization signal burst set.

The user equipment receives the configuration information, of the synchronization signal and PBCH block, that is sent by the TRP.

The configuration information of the synchronization signal and PBCH block may be specifically carried in a signaling message, or may be carried in a physical resource block, or may be flexibly set as required. For a specific implementation, refer to descriptions in the following embodiments.

Step 103: The user equipment determines the location of the synchronization signal and PBCH block in the synchronization signal burst set based on the location indication information, receives the synchronization signal and PBCH block at the location, and performs downlink synchronization based on the synchronization signal and PBCH block.

In a specific possible implementation, the location indication information includes a location indication value, and the location indication value is used by the user equipment to determine the location of the synchronization signal and PBCH block in the synchronization signal burst set based on the location indication value and a first preset mapping relationship. The first preset mapping relationship includes a plurality of values and locations of various synchronization signal and PBCH blocks in the synchronization signal set, and the plurality of values are in a one-to-one correspondence with the locations of the various synchronization signal and PBCH blocks in the synchronization signal set. Both the TRP and the user equipment may store the first preset mapping relationship.

Specifically, all possible locations of SS blocks in one synchronization signal burst set (SS burst set) are P=[p_1, p_2, . . . , p_n]. Any subset of P may be corresponding to a unique number q. A sum of all possible subsets of the set P may be denoted as $B_n$ (Bell number):

$$B_n = \sum_{k=0}^{n} \left\{ {n \atop k} \right\}.$$

Herein, $$\left\{ {n \atop k} \right\}$$

represents a combinatorial number $C_n^k$, n is a total quantity of all time resource locations in the SS burst set that are obtained through division based on a time length corresponding to an SS block, and k is a quantity of SS blocks that are actually sent. A first preset mapping relationship includes all possible locations of the SS blocks in the SS burst set and positive integers corresponding to the locations, and each possible location is in a one-to-one correspondence with a positive integer.

Optionally, to reduce bit (bit) overheads of the location indication information, only m SS blocks may be configured, and an arrangement manner of the m SS blocks is indicated with q. Specifically, the first preset mapping relationship may be as follows:

| | |
|---|---|
| q = 1 | First m SS blocks are selected |
| q = 2 | Last m SS blocks are selected |
| q = 3 | First m SS blocks are selected every x locations |
| q = 4 | Last m SS blocks are selected every x locations |

In this way, only two bits are needed to indicate a location of an SS block in the synchronization signal burst set.

Herein, m and x may be flexibly set as required, where m is any positive integer, and x is any positive integer less than n−m.

As shown in FIG. 4B, n SS blocks (an SS Block #0, an SS Block #1, . . . , an SS Block #(n−1)) distributed in r slots (a Slot i, a Slot i+1, . . . , and a Slot i+r) form an SS block set. A plurality of SS blocks in each slot form an SS burst. For example, the SS block #0 and the SS block #1 in the slot i form an SS burst #0. Herein, two SS blocks are used as an example for description. Certainly, there may be three, four, or more SS blocks. There may be no SS block at time locations corresponding to some SS blocks in the n SS blocks shown in FIG. 4B. For example, the SS block #0 may not be placed at a time location corresponding to the SS block #0 shown in FIG. 4B. In other words, a quantity of SS blocks and locations of the SS blocks in one SS block set may be flexibly set as required. When an SS block set includes only one SS block, there may be n possibilities of a specific location of the SS block. In other words, the SS block may be any SS block shown in FIG. 4B. When an SS block set includes only two SS blocks, there may be $C_n^2$ possibilities of specific locations of the SS blocks. In other words, the two SS blocks may be any two SS blocks shown in FIG. 4B. Other cases may be deduced by analogy. A location of each SS block in the SS block set is set to be corresponding to a value. In other words, the first preset mapping relationship is set. When receiving the value, the user equipment may uniquely determine a distribution manner of the SS block in the SS block set based on the first preset mapping relationship, to receive the SS block at a corresponding location.

A manner in which only m SS blocks may be configured to reduce bit overheads of location indication information is specifically described by using the structure shown in FIG. 4B. Specifically, when L=1, SS blocks are sent at time locations corresponding to (the SS Block #0, the SS Block #1, . . . , and the SS Block #(m−1)); or when L=2, SS blocks are sent at time locations corresponding to (the SS Block #(n−m), the SS Block #(n−m−1), . . . , and the SS Block #(n−1)).

It should be noted that the SS block set shown in FIG. 4B is merely an example for description, and may alternatively be of a structure in another form. This is not limited in this embodiment of the present invention.

In another specific possible implementation, the location indication information includes an N-bit binary number, N is a quantity of synchronization signal and PBCH blocks in the synchronization signal burst set, each bit in the N-bit binary number is corresponding to one synchronization signal and PBCH block, and the N-bit binary number is used by the user equipment to determine a location of the synchronization signal and PBCH block in the synchronization signal burst set based on a binary value of each bit.

A binary value 1 is used to indicate that a synchronization signal and PBCH block is sent at a corresponding location in the synchronization signal burst set, and a binary value 0 is used to indicate that no synchronization signal and PBCH block is sent at a corresponding location in the synchronization signal burst set. Alternatively, a binary value 1 is used to indicate that no synchronization signal and PBCH block is sent at a corresponding location in the synchronization signal burst set, and a binary value 0 is used to indicate that a synchronization signal and PBCH block is sent at a corresponding location in the synchronization signal burst set.

Specifically, all possible locations of SS blocks in one synchronization signal burst set (SS burst set) are P=[p_1, p_2, . . . , p_n], and a binary number may be used to represent location information of the SS blocks. Each bit of the binary number is corresponding to a location of P. For each bit, 0 is used to indicate that no SS block is sent, and 1 is used to indicate that an SS block is sent. Alternatively, for each bit, 1 is used to indicate that no SS block is sent, and 0 is used to indicate that an SS block is sent.

A representation shape of the binary number is further described by using FIG. 4B as an example. p_1 in P=[p_1, p_2, . . . , p_n] is corresponding to the SS block #0 in FIG. 4B, p_2 is corresponding to the SS block #1 in FIG. 4B, and by analogy, p_n is corresponding to the SS block #(n−1) in FIG. 4B. A specific value of p_i is related to whether there is an SS block at a time location of an SS block corresponding to p_i. For example, that p_i=1 is used to indicate that there is an SS block at a time location corresponding to an SS block #(i−1), where i is a positive integer ranging from 1 to n.

Optionally, to reduce bit overheads of the location indication information, the location indication information may be implicitly indicated by using binary sequence scrambling code. To be specific, a binary number carrying the location indication information and/or time cycle indication information is used to generate a pseudo random sequence (for example, by using a shift register), scrambling is performed on another downlink signal by using the pseudo random sequence, and the UE performs blind detection to obtain the binary number. In this way, there is no need to use additional signaling or add an information bit, and signaling reuse is implemented.

Optionally, a specific implementation of step 103 may be as follows. The location of the synchronization signal and PBCH block in the synchronization signal burst set is determined based on the location indication value and the first preset mapping relationship, the synchronization signal and PBCH block is received at the location, and downlink synchronization is performed based on the synchronization signal and PBCH block.

Optionally, another specific implementation of step 103 may be as follows. The location of the synchronization signal and PBCH block in the synchronization signal burst set is determined based on the N-bit binary number, the synchronization signal and PBCH block is received at the location, and downlink synchronization is performed based on the synchronization signal and PBCH block.

Optionally, the configuration information of the synchronization signal and PBCH block may further include the time cycle indication information, and the user equipment may determine a time cycle of the synchronization signal burst set based on the time cycle indication value and a second preset mapping relationship.

Specifically, the second preset mapping relationship includes all possible time cycles of the SS burst set and positive integers corresponding to the time cycles, and each possible time cycle is in a one-to-one correspondence with a positive integer. The positive integer may be indicated by using a bit value.

Optionally, the TRP may configure another signal such as a data/control signal at a time location that is in the synchronization signal burst set and at which no SS block is actually sent, and the user equipment receives the data/control signaling at the location that is in the synchronization signal burst set and at which no synchronization signal and PBCH block is sent. In this way, spectrum resource efficiency of the UE may be effectively improved.

In this embodiment, the TRP sends the configuration information of the synchronization signal and PBCH block to the user equipment, and the configuration information of the synchronization signal and PBCH block includes the location indication information. The user equipment determines the location of the synchronization signal and PBCH block in the synchronization signal burst set based on the location indication information, receives the synchronization signal and PBCH block at the location, and performs downlink synchronization based on the synchronization signal and PBCH block. In this way, the UE can more accurately perform downlink synchronization by using a synchronization signal, thereby effectively improving utilization of spectrum resources.

The configuration information of the synchronization signal and PBCH block in the embodiment shown in FIG. 4A includes the location indication information, or includes both the location indication information and the time cycle indication information. Different from the embodiment shown in FIG. 4A, configuration information of a synchronization signal and PBCH block in an embodiment shown in FIG. 5 includes time cycle indication information. For details, refer to specific descriptions in the following embodiment.

Figure 5:
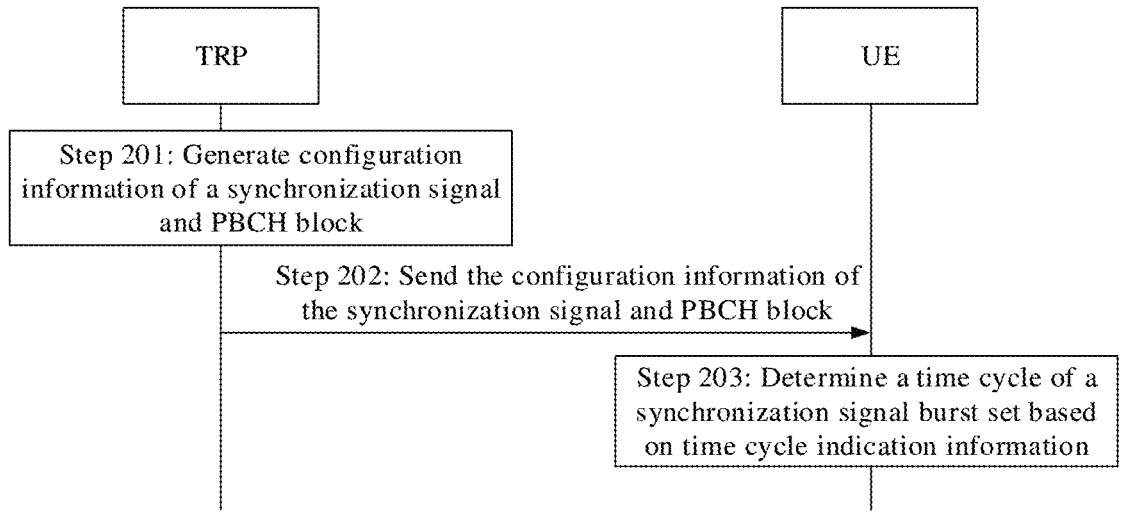
FIG. 5 is a flowchart of another downlink synchronization method according to an embodiment of the present invention.

FIG. 5 is a flowchart of another downlink synchronization method according to an embodiment of the present invention. As shown in FIG. 5, the method in this embodiment may include the following steps.

Step 201: A TRP generates configuration information of a synchronization signal and PBCH block, where the configuration information of the synchronization signal and PBCH block includes time cycle indication information.

Step 202: The TRP sends the configuration information of the synchronization signal and PBCH block to user equipment, where the time cycle indication information is used to indicate a time cycle of a synchronization signal burst set.

The user equipment receives the configuration information, of the synchronization signal and PBCH block, that is sent by the TRP.

Step 203: The user equipment determines the time cycle of the synchronization signal burst set based on the time cycle indication information, receives the synchronization signal and PBCH block based on the time cycle, and performs downlink synchronization based on the synchronization signal and PBCH block.

Optionally, the time cycle indication information includes a time cycle indication value, and the time cycle indication value is used by the user equipment to determine the time cycle of the synchronization signal burst set based on the time cycle indication value and a second preset mapping relationship.

Specifically, the second preset mapping relationship includes all possible time cycles of the SS burst set and positive integers corresponding to the time cycles, and each possible time cycle is in a one-to-one correspondence with a positive integer. The positive integer may be indicated by using a bit value.

Correspondingly, a specific implementation of step 203 may be as follows. The user equipment determines the time cycle of the synchronization signal burst set based on the time cycle indication value and the second preset mapping relationship.

Optionally, the TRP may configure another signal such as a data/control signal at a time location that is in the synchronization signal burst set and at which no SS block is actually sent, and the user equipment receives the data/control signaling at the location that is in the synchronization signal burst set and at which no synchronization signal and PBCH block is sent. In this way, spectrum resource efficiency of the UE may be effectively improved.

In this embodiment, the TRP sends the configuration information of the synchronization signal and PBCH block to the user equipment, and the configuration information of the synchronization signal and PBCH block includes the time cycle indication information. The user equipment determines the time cycle of the synchronization signal burst set based on the time cycle indication information, receives the synchronization signal and PBCH block based on the time cycle, and performs downlink synchronization based on the synchronization signal and PBCH block. In this way, the UE can more accurately perform downlink synchronization by using a synchronization signal, thereby effectively improving utilization of spectrum resources.

A specific implementation in which the TRP sends the configuration information of the synchronization signal and PBCH block to the user equipment in the foregoing embodiments is described in detail below by using several specific embodiments. As described in the foregoing two embodiments, the configuration information of the synchronization signal and PBCH block includes the location indication information and/or the time cycle indication information.

Figure 6:
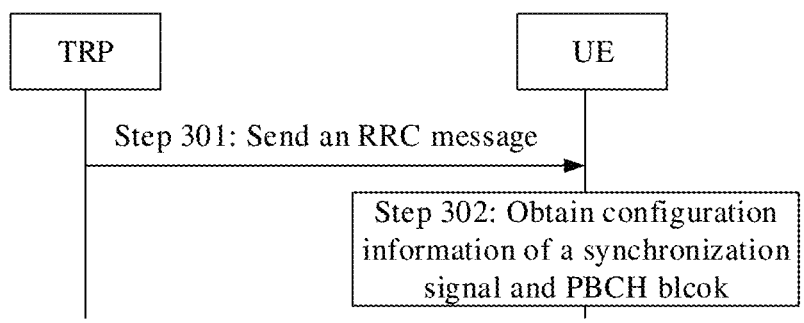
FIG. 6 is a flowchart of another downlink synchronization method according to an embodiment of the present invention.

FIG. 6 is a flowchart of another downlink synchronization method according to an embodiment of the present invention. As shown in FIG. 6, the method in this embodiment may include the following steps.

S301. A TRP sends a radio resource control RRC message to UE.

The UE receives the RRC message sent by the TRP.

The RRC message includes the configuration information of the synchronization signal and PBCH block in the foregoing embodiments. The RRC message may be a new type of RRC message. In other words, the RRC message is used to transmit the configuration information of the synchronization signal and PBCH block to the UE.

S302. The UE obtains the configuration information of the synchronization signal and PBCH block based on the RRC message.

Specifically, the UE may complete downlink synchronization by using the configuration information of the synchronization signal and PBCH block.

In this embodiment, the TRP sends the configuration information of the synchronization signal and PBCH block to the user equipment by using the RRC message, where the configuration information of the synchronization signal and PBCH block includes time cycle indication information and/or location indication information, and the user equipment performs downlink synchronization based on the configuration information of the synchronization signal and PBCH block. In this way, the configuration information of the synchronization signal and PBCH block is indicated by using the RRC message, so that the UE can more accurately perform downlink synchronization by using a synchronization signal, thereby effectively improving utilization of spectrum resources.

Figure 7:
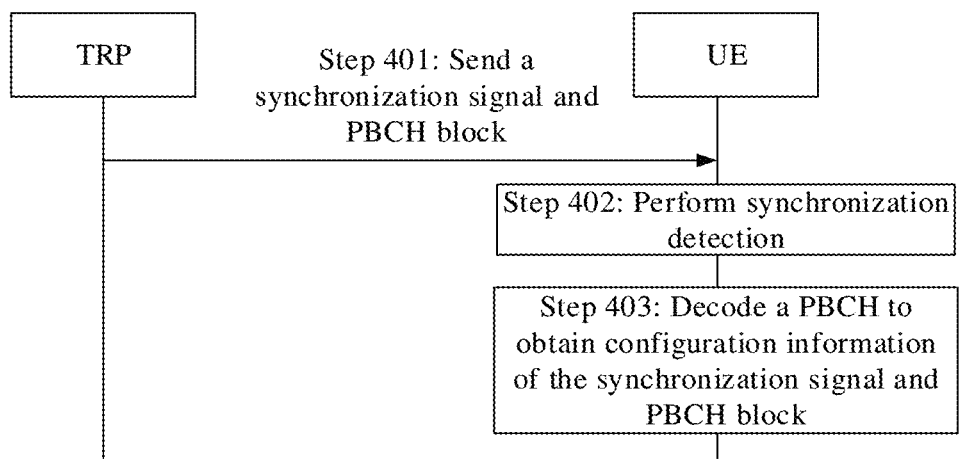
FIG. 7 is a flowchart of another downlink synchronization method according to an embodiment of the present invention.

FIG. 7 is a flowchart of another downlink synchronization method according to an embodiment of the present invention. As shown in FIG. 7, the method in this embodiment may include the following steps.

S401. A TRP sends a synchronization signal and PBCH block to UE.

The UE receives the synchronization signal and PBCH block sent by the TRP.

The synchronization signal and PBCH block includes a PSS, an SSS, and a PBCH, and the PBCH carries the configuration information of the synchronization signal and PBCH block in the foregoing embodiments. Specifically, a length of the PBCH may be increased to carry the configuration information of the synchronization signal and PBCH block. In other words, a bit is added to the PBCH to carry the configuration information of the synchronization signal and PBCH block in the foregoing embodiments.

Optionally, the configuration information of the synchronization signal and PBCH block may alternatively be implicitly indicated in a manner of adding binary scrambling code to the PBCH. To be specific, a binary number carrying location indication information and/or time cycle indication information is used to generate a pseudo random sequence (for example, by using a shift register), scrambling is performed on the PBCH by using the pseudo random sequence, and the UE performs blind detection to obtain the binary number. In this way, the configuration information of the synchronization signal and PBCH block is obtained without additional bit overheads, and signaling reuse is implemented.

S402. The UE performs synchronization detection.

Specifically, the UE performs synchronization detection and time synchronization by using the PSS and the SSS.

S403. The UE decodes the PBCH to obtain the configuration information of the synchronization signal and PBCH block.

Specifically, the UE decodes the PBCH to obtain the configuration information of the synchronization signal and PBCH block, so as to learn of a time cycle of an SS burst set and/or a location of the SS block in the SS burst set.

In this embodiment, the TRP sends the synchronization signal and PBCH block to the UE, the UE performs synchronization detection, and decodes the PBCH to obtain the configuration information of the synchronization signal and PBCH block, and the user equipment performs downlink synchronization based on the configuration information of the synchronization signal and PBCH block. In this way, the configuration information of the synchronization signal and PBCH block is indicated by using the PBCH, so that the UE can more accurately perform downlink synchronization by using a synchronization signal, thereby effectively improving utilization of spectrum resources.

Figure 8:
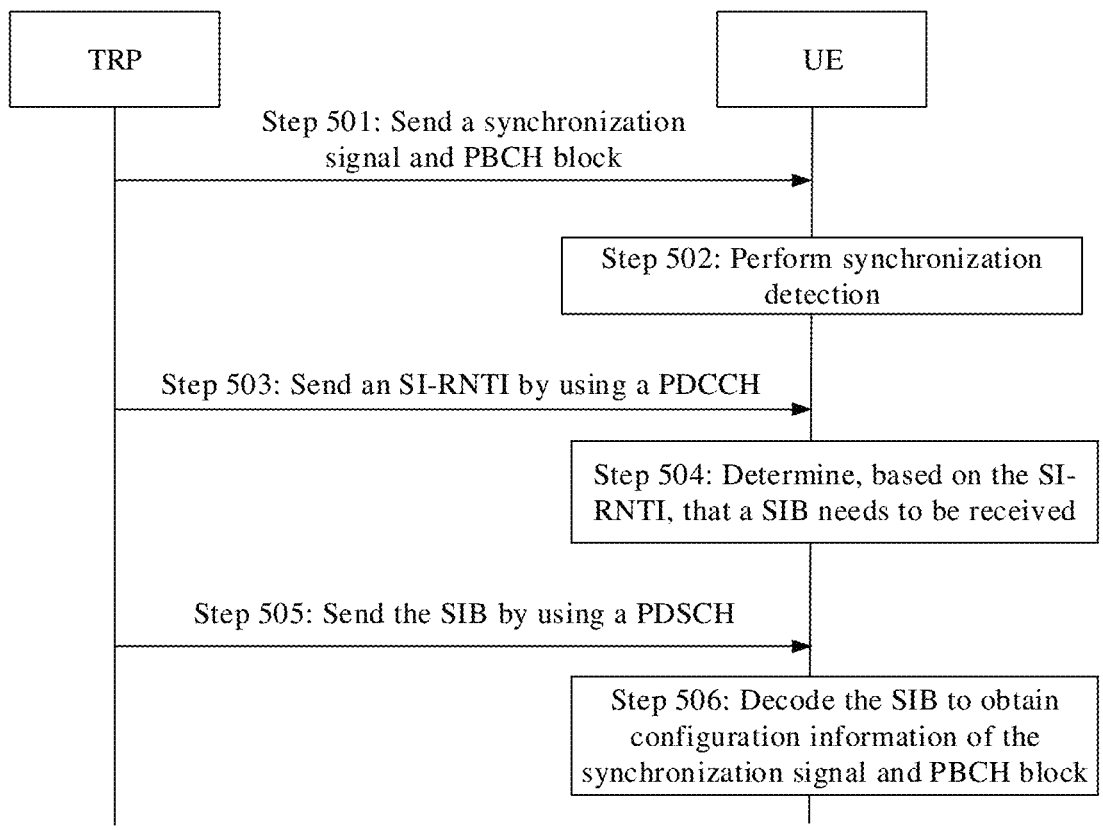
FIG. 8 is a flowchart of another downlink synchronization method according to an embodiment of the present invention.

FIG. 8 is a flowchart of another downlink synchronization method according to an embodiment of the present invention. As shown in FIG. 8, the method in this embodiment may include the following steps.

S501. A TRP sends a synchronization signal and PBCH block to UE.

The UE receives the synchronization signal and PBCH block sent by the TRP.

The synchronization signal and PBCH block includes a PSS, an SSS, and a PBCH.

S502. The UE performs synchronization detection.

Specifically, the UE performs synchronization detection and time synchronization by using the PSS and the SSS, and receives control information on a PDCCH.

S503. The TRP sends a system information radio network temporary identifier (SI-RNTI) to the UE by using the PDCCH.

The UE detects whether there is the SI-RNTI on the PDCCH. If there is the SI-RNTI on the PDCCH, it is determined that a SIB needs to be received.

S504. The UE determines, based on the SI-RNTI, that the SIB needs to be received.

S505. The TRP sends the SIB by using a PDSCH.

S506. The UE decodes the SIB to obtain configuration information of the synchronization signal and PBCH block.

Specifically, the UE decodes the SIB to obtain the configuration information of the synchronization signal and PBCH block, so as to learn of a time cycle of an SS burst set and/or a location of the SS block in the SS burst set.

Optionally, the SIB carrying the configuration information of the synchronization signal and PBCH block may be a new SIB, or an existing SIB may be reused. A manner in which the existing SIB is reused may be specifically as follows. The configuration information of the synchronization signal and PBCH block is implicitly indicated in a manner of adding binary scrambling code to the existing SIB. To be specific, a binary number carrying location indication information and/or time cycle indication information is used to generate a pseudo random sequence (for example, by using a shift register), scrambling is performed on the SIB by using the pseudo random sequence, and the UE performs blind detection to obtain the binary number. In this way, the configuration information of the synchronization signal and PBCH block is obtained without additional signaling overheads, and signaling reuse is implemented.

In this embodiment, the TRP sends the configuration information of the synchronization signal and PBCH block to the UE by using the SIB, and the user equipment performs downlink synchronization based on the configuration information of the synchronization signal and PBCH block. In this way, the configuration information of the synchronization signal and PBCH block is indicated by using the SIB, so that the UE can more accurately perform downlink synchronization by using a synchronization signal, thereby effectively improving utilization of spectrum resources.

With reference to FIG. 4A to FIG. 8, the downlink synchronization methods in the embodiments of the present invention are described above in detail. The embodiments of the present invention further provide a transmission reception point and user equipment. For working principles or functions of modules of the transmission reception point and the user equipment, refer to the method procedures in FIG. 4A and FIG. 8. Details are not described herein again.

Figure 9:
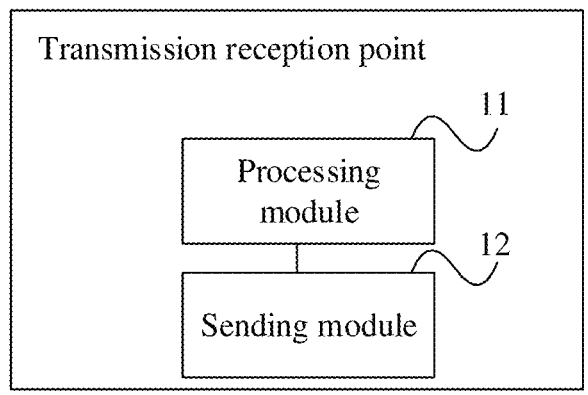
FIG. 9 is a schematic structural diagram of a transmission reception point according to an embodiment of the present invention.

FIG. 9 is a schematic structural diagram of a transmission reception point according to an embodiment of the present invention. As shown in FIG. 9, the apparatus in this embodiment may include a processing module 11 and a sending module 12. The processing module 11 is configured to generate configuration information of a synchronization signal and PBCH block, where the configuration information of the synchronization signal and PBCH block includes location indication information. The sending module 12 is configured to send the configuration information of the synchronization signal and PBCH block to user equipment, where the location indication information is used to indicate a location of the synchronization signal and PBCH block in a synchronization signal burst set.

Optionally, the sending module 12 is specifically configured to send the configuration information of the synchronization signal and PBCH block to the user equipment by using a radio resource control RRC message, send the configuration information of the synchronization signal and PBCH block to the user equipment by using a physical broadcast channel, or send the configuration information of the synchronization signal and PBCH block to the user equipment by using a system information block.

Optionally, the location indication information includes a location indication value, and the location indication value is used by the user equipment to determine the location of the synchronization signal and PBCH block in the synchronization signal burst set based on the location indication value and a first preset mapping relationship.

Optionally, the location indication information includes an N-bit binary number, N is a quantity of synchronization signal and PBCH blocks in the synchronization signal burst set, each bit in the N-bit binary number is corresponding to one synchronization signal and PBCH block, and the N-bit binary number is used by the user equipment to determine a location of the synchronization signal and PBCH block in the synchronization signal burst set based on a binary value of each bit.

Optionally, a binary value 1 is used to indicate that a synchronization signal and PBCH block is sent at a corresponding location in the synchronization signal burst set, and a binary value 0 is used to indicate that no synchronization signal and PBCH block is sent at a corresponding location in the synchronization signal burst set, or a binary value 1 is used to indicate that no synchronization signal and PBCH block is sent at a corresponding location in the synchronization signal burst set, and a binary value 0 is used to indicate that a synchronization signal and PBCH block is sent at a corresponding location in the synchronization signal burst set.

Optionally, the configuration information of the synchronization signal and PBCH block further includes time cycle indication information, and the time cycle indication information is used to indicate a time cycle of the synchronization signal burst set.

The apparatus in this embodiment may be configured to execute the technical solutions in the foregoing method embodiments. Implementation principles and technical effects thereof are similar. Details are not described herein again.

Figure 10:
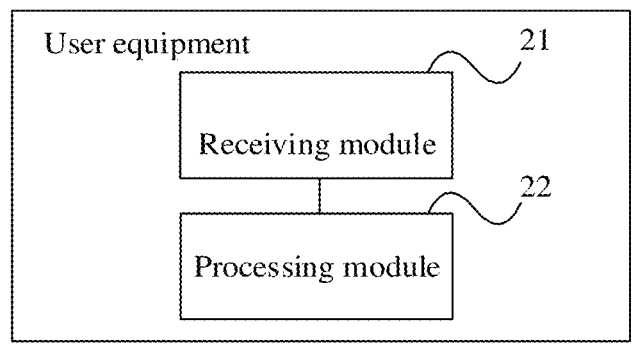
FIG. 10 is a schematic structural diagram of user equipment according to an embodiment of the present invention.

FIG. 10 is a schematic structural diagram of user equipment according to an embodiment of the present invention. As shown in FIG. 10, the apparatus in this embodiment may include a receiving module 21 and a processing module 22. The receiving module 21 is configured to receive configuration information, of a synchronization signal and PBCH block, that is sent by a transmission reception point TRP, where the configuration information of the synchronization signal and PBCH block includes location indication information. The processing module 22 is configured to determine a location of the synchronization signal and PBCH block in a synchronization signal burst set based on the location indication information, receive the synchronization signal and PBCH block at the location, and perform downlink synchronization based on the synchronization signal and PBCH block.

Optionally, the receiving module 21 is specifically configured to receive a radio resource control RRC message sent by the TRP, where the radio resource control RRC message includes the configuration information of the synchronization signal and PBCH block, receive the synchronization signal and PBCH block sent by the TRP, where the synchronization signal and PBCH block includes a synchronization signal and a physical broadcast channel PBCH, and the PBCH includes the configuration information of the synchronization signal and PBCH block, or receive a system information block sent by the TRP, where the system information block includes the configuration information of the synchronization signal and PBCH block.

Optionally, the location indication information includes a location indication value, and the processing module 22 is specifically configured to determine the location of the synchronization signal and PBCH block in the synchronization signal burst set based on the location indication value and a first preset mapping relationship, receive the synchronization signal and PBCH block at the location, and perform downlink synchronization based on the synchronization signal and PBCH block.

Optionally, the location indication information includes an N-bit binary number, N is a quantity of synchronization signal and PBCH blocks in the synchronization signal burst set, and the processing module 22 is specifically configured to determine the location of the synchronization signal and PBCH block in the synchronization signal burst set based on the N-bit binary number, receive the synchronization signal and PBCH block at the location, and perform downlink synchronization based on the synchronization signal and PBCH block.

Optionally, the configuration information of the synchronization signal and PBCH block further includes time cycle indication information, and the processing module 22 is further configured to determine a time cycle of the synchronization signal burst set based on the time cycle indication information and a second preset mapping relationship.

Optionally, the receiving module 21 is further configured to receive data or control signaling at a location that is in the synchronization signal burst set and at which no synchronization signal and PBCH block exists.

The apparatus in this embodiment may be configured to execute the technical solutions in the foregoing method embodiments. Implementation principles and technical effects thereof are similar. Details are not described herein again.

An embodiment of the present invention further provides another transmission reception point. A schematic diagram of a connection structure of the transmission reception point is the same as that of a connection structure shown in FIG. 9. A processing module is configured to generate configuration information of a synchronization signal and PBCH block, where the configuration information of the synchronization signal and PBCH block includes time cycle indication information. A sending module is configured to send the configuration information of the synchronization signal and PBCH block to user equipment, where the time cycle indication information is used to indicate a time cycle of a synchronization signal burst set.

Optionally, the time cycle indication information includes a time cycle indication value, and the time cycle indication value is used by the user equipment to determine the time cycle of the synchronization signal burst set based on the time cycle indication value and a second preset mapping relationship.

The apparatus in this embodiment may be configured to execute the technical solutions in the foregoing method embodiments. Implementation principles and technical effects thereof are similar. Details are not described herein again.

An embodiment of the present invention further provides another user equipment. A schematic diagram of a connection structure of the another user equipment is the same as that of a connection structure shown in FIG. 10. A receiving module is configured to receive configuration information, of a synchronization signal and PBCH block, that is sent by a transmission reception point TRP, where the configuration information of the synchronization signal and PBCH block includes time cycle indication information. A processing module is configured to determine a time cycle of a synchronization signal burst set based on the time cycle indication information, receive the synchronization signal and PBCH block based on the time cycle, and perform downlink synchronization based on the synchronization signal and PBCH block.

Optionally, the time cycle indication information includes a time cycle indication value, and the processing module is specifically configured to determine the time cycle of the synchronization signal burst set based on the time cycle indication value and a second preset mapping relationship.

Optionally, the receiving module is further configured to receive data or control signaling at a location that is in a radio frame and at which no synchronization signal and PBCH block exists.

The apparatus in this embodiment may be configured to execute the technical solutions in the foregoing method embodiments. Implementation principles and technical effects thereof are similar. Details are not described herein again.

For an interaction process of the foregoing apparatuses, refer to the descriptions in the foregoing method embodiments. For beneficial effects of the foregoing apparatuses, refer to the beneficial effects brought by the foregoing method embodiments. Details are not described herein again.

When at least some functions of the downlink synchronization methods in the embodiments of the present invention are implemented by using software, an embodiment of the present invention further provides a computer-readable storage medium that may be a non-transitory computer readable medium. The computer-readable storage medium is configured to store a computer software instruction used by the foregoing transmission reception point, and when the computer software instruction runs on a computer, the computer may perform various possible downlink synchronization methods in the foregoing method embodiments. When the computer execution instruction is loaded and executed on the computer, some or all of the procedures or functions according to the embodiments of the present invention may be generated. The computer instruction may be stored in a computer-readable storage medium, or may be transmitted from one computer-readable storage medium to another computer-readable storage medium, and the transmission may be performed with another website site, a computer, a server, or a data center in a wireless (for example, cellular communication, infrared, short-distance wireless, or microwave) manner. The computer-readable storage medium may be any available medium accessible to a computer, or a data storage device, such as a server or a data center integrating one or more available media. The available medium may be a magnetic medium (for example, a floppy disk, a hard disk, or a magnetic tape), an optical medium (for example, a DVD), or a semiconductor medium (for example, a Solid State Disk Solid State Disk (SSD)).

In addition, an embodiment of the present invention further provides a computer program product, namely, a software product, including an instruction. When the computer program product runs on a computer, the computer performs various possible downlink synchronization methods in the foregoing method embodiments. Implementation principles and technical effects thereof are similar. Details are not described herein again.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

The descriptions are only specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A downlink synchronization method, comprising:
   receiving configuration information of a synchronization signal and physical broadcast channel (PBCH) block and that is sent by a transmission reception point (TRP), wherein the configuration information of the synchronization signal and PBCH block comprises at least one of location indication information or time cycle indication information;
   determining at least one of a location of the synchronization signal and PBCH block in a synchronization signal burst set according to the location indication information or a time cycle of a synchronization signal burst set according to the time cycle indication information, wherein the synchronization signal burst set corresponds to a complete beam sweeping process and comprises a plurality of synchronization signal bursts, and wherein each synchronization signal burst of the plurality of synchronization signal bursts comprises a plurality of synchronization signal blocks that have the synchronization signal and PBCH block and that are distributed in a same slot;
   receiving the synchronization signal and PBCH block according to at least one of the location or the time cycle; and
   performing downlink synchronization according to the synchronization signal and PBCH block.

2. The method according to claim 1, wherein the receiving the configuration information comprises performing at least one of:
   receiving a radio resource control (RRC) message sent by the TRP, wherein the radio resource control RRC message comprises the configuration information of the synchronization signal and PBCH block;

receiving the synchronization signal and PBCH block sent by the TRP, wherein the synchronization signal and PBCH block comprises a synchronization signal and a PBCH, and wherein the PBCH comprises the configuration information of the synchronization signal and PBCH block; or receiving a system information block sent by the TRP, wherein the system information block comprises the configuration information of the synchronization signal and PBCH block.

3. The method according to claim 1, wherein the location indication information comprises a location indication value; and
   wherein the determining the at least one of the location of the synchronization signal and PBCH block or the time cycle of the synchronization signal burst set comprises:
      determining the location of the synchronization signal and PBCH block in the synchronization signal burst set according to the location indication value and a first preset mapping relationship.

4. The method according to claim 3, wherein the location indication information comprises an N-bit binary number, and wherein N is a quantity of synchronization signal and PBCH blocks in the synchronization signal burst set; and
   wherein the determining the location of the synchronization signal and PBCH block comprises:
      determining the location of the synchronization signal and PBCH block in the synchronization signal burst set according to the N-bit binary number.

5. The method according to claim 1, wherein the configuration information of the synchronization signal and PBCH block further comprises time cycle indication information; and
   wherein the method further comprises determining a time cycle of the synchronization signal burst set based on the time cycle indication information and a second preset mapping relationship.

6. The method according to claim 1, wherein the method further comprises:
   receiving data or control signaling at a location of at least one of the synchronization signal burst set or of a radio frame and at which no synchronization signal and PBCH block exists.

7. The method according to claim 1, wherein the time cycle indication information comprises a time cycle indication value; and
   wherein the determining the time cycle of the synchronization signal burst set comprises:
      determining the time cycle of the synchronization signal burst set according to the time cycle indication value and a second preset mapping relationship.

8. A transmission reception point, comprising:
a processor; and
a non-transitory computer-readable storage medium storing a program to be executed by the processor, the program including instructions to:
   generate configuration information of a synchronization signal and physical broadcast channel (PBCH) block, wherein the configuration information of the synchronization signal and PBCH block comprises at least one of location indication information or time cycle indication information; and
   send the configuration information of the synchronization signal and PBCH block to user equipment, wherein the location indication information indicate a location of the synchronization signal and PBCH block in a synchronization signal burst set, wherein the time cycle indication information indicates a time cycle of the synchronization signal burst set, wherein the synchronization signal burst set corresponds to a complete beam sweeping process and comprises a plurality of synchronization signal bursts, and wherein each synchronization signal burst of the plurality of synchronization signal bursts comprises a plurality of synchronization signal blocks that have the synchronization signal and PBCH block and that are distributed in a same slot.

9. The transmission reception point according to claim 8, wherein the instructions to send the configuration information include instructions to perform at least one of:
   send the configuration information of the synchronization signal and PBCH block to the user equipment by using a radio resource control (RRC) message;
   send the configuration information of the synchronization signal and PBCH block to the user equipment by using a physical broadcast channel; or
   send the configuration information of the synchronization signal and PBCH block to the user equipment by using a system information block.

10. The transmission reception point according to claim 8, wherein the location indication information comprises a location indication value, and wherein the location indication value is used by the user equipment to determine the location of the synchronization signal and PBCH block in the synchronization signal burst set according the location indication value and a first preset mapping relationship.

11. The transmission reception point according to claim 8, wherein the location indication information comprises an N-bit binary number, wherein N is a quantity of synchronization signal and PBCH blocks in the synchronization signal burst set, wherein each bit in the N-bit binary number corresponds to one synchronization signal and PBCH block, and wherein the N-bit binary number is used by the user equipment to determine a location of the synchronization signal and PBCH block in the synchronization signal burst set according to a binary value of each bit.

12. The transmission reception point according to claim 11, wherein values of the N-bit binary indicate locations of synchronization signal and PBCH blocks, and wherein at least one of:
   a binary value 1 in the N-bit binary number indicates that a synchronization signal and PBCH block is sent at a corresponding location in the synchronization signal burst set, and wherein a binary value o in the N-bit binary number indicates that no synchronization signal and PBCH block is sent at a corresponding location in the synchronization signal burst set; or
   a binary value 1 in the N-bit binary number indicates that no synchronization signal and PBCH block is sent at a corresponding location in the synchronization signal burst set, and wherein a binary value o in the N-Bit binary number is used to indicates that a synchronization signal and PBCH block is sent at a corresponding location in the synchronization signal burst set.

13. The transmission reception point according to claim 8, wherein the time cycle indication information comprises a time cycle indication value, and wherein the time cycle indication value is used by the user equipment to determine the time cycle of the synchronization signal burst set according to the time cycle indication value and a second preset mapping relationship.

14. A user equipment, comprising:
a processor; and a non-transitory computer-readable storage medium storing a program to be executed by the processor, the program including instructions to:
  receive configuration information of a synchronization signal and physical broadcast channel (PBCH) and that is sent by a transmission reception point (TRP), wherein the configuration information of the synchronization signal and PBCH block comprises at least one of location indication information or time cycle indication information;
  determine at least one of a location of the synchronization signal and PBCH block in a synchronization signal burst set according to the location indication information or a time cycle of the synchronization signal burst set according to the time cycle indication information, wherein the synchronization signal burst set corresponds to a complete beam sweeping process and comprises a plurality of synchronization signal bursts, and wherein each synchronization signal burst of the plurality of synchronization signal bursts comprises a plurality of synchronization signal blocks that have the synchronization signal and PBCH block and that are distributed in a same slot;
  receive the synchronization signal and PBCH block at least one of the location or the time cycle; and
  perform downlink synchronization according to the synchronization signal and PBCH block.

15. The user equipment according to claim 14, wherein the instructions to receive the configuration information include instructions to perform at least one of:
  receive a radio resource control (RRC) message sent by the TRP, wherein the radio resource control RRC message comprises the configuration information of the synchronization signal and PBCH block;
  receive the synchronization signal and PBCH block sent by the TRP, wherein the synchronization signal and PBCH block comprises a synchronization signal and a physical broadcast channel (PBCH), and wherein the PBCH comprises the configuration information of the synchronization signal and PBCH block; or
  receive a system information block sent by the TRP, wherein the system information block comprises the configuration information of the synchronization signal and PBCH block.

16. The user equipment according to claim 14, wherein the location indication information comprises a location indication value; and
  wherein the instructions to determine the location of the synchronization signal include instructions to:
    determine the location of the synchronization signal and PBCH block in the synchronization signal burst according to the location indication value and a first preset mapping relationship.

17. The user equipment according to claim 14, wherein the location indication information comprises an N-bit binary number, and wherein N is a quantity of synchronization signal and PBCH blocks in the synchronization signal burst set; and
  wherein the instructions to determine the location of the synchronization signal include instructions to:
    determine the location of the synchronization signal and PBCH block in the synchronization signal burst set according to the N-bit binary number.

18. The user equipment according to claim 14, wherein the configuration information further comprises time cycle indication information; and
  wherein the instructions to determine the time cycle of the synchronization signal burst set include instructions to:
    determine a time cycle of the synchronization signal burst set according to the time cycle indication information and a second preset mapping relationship.

19. The user equipment according to claim 14, wherein the program further includes instructions to:
  receive data or control signaling at a location that is in at least one of the synchronization signal burst set or of a radio frame and at which no synchronization signal and PBCH block exists.

20. The user equipment according to claim 14, wherein the time cycle indication information comprises a time cycle indication value; and
  wherein the instructions to determine the time cycle of the synchronization signal burst set include instructions to:
    determine the time cycle of the synchronization signal burst set according to the time cycle indication value and a second preset mapping relationship.

* * * * *